Oct. 29, 1968

C. J. STRUTZ, JR., ET AL 3,407,915

CONVEYOR FOR WORKPIECE DECORATING APPARATUS
AND METHOD FOR ITS USE

Filed Feb. 8, 1967

INVENTORS.
CARL STRUTZ, JR.
ROME R. RUDOLPH
FRANK C. STRUTZ

BY
ATTORNEY

INVENTORS.
CARL STRUTZ, JR.
ROME R. RUDOLPH
FRANK C. STRUTZ

BY

ATTORNEY

United States Patent Office 3,407,915
Patented Oct. 29, 1968

3,407,915
CONVEYOR FOR WORKPIECE DECORATING
APPARATUS AND METHOD FOR ITS USE
Carl J. Strutz, Jr., Mars, Rome R. Rudolph, Gibsonia, and Frank C. Strutz, Mars, Pa., assignors to Carl Strutz & Co., Inc., Valencia, Pa., a corporation of Pennsylvania
Filed Feb. 8, 1967, Ser. No. 614,589
5 Claims. (Cl. 198—19)

ABSTRACT OF THE DISCLOSURE

Workpiece decorating apparatus is described wherein a main conveyor engages spaced sprockets supported for rotation about spaced parallel axes which are inclined from the horizontal. A plurality of workpiece carriers are secured to the main conveyor by brackets arranged to position the carriers at a predetermined angle relative to the inclined axes of the sprockets. The overall arrangement is such that the workpieces moving along the upper reach are positioned generally horizontal and may be registered and decorated while those workpieces moving along the lower reach are positioned generally vertical. This arrangement permits undecorated workpieces to be deposited on successive ones of the carriers while in a vertical position and permits the decorated workpieces to be discharged from the main conveyor in a vertical position.

BACKGROUND OF THE INVENTION (1) *Field of the invention.*— This invention relates to workpiece decorating apparatus of the type wherein workpieces are conveyed continuously and in succession past a registration station and one or more decorating stations, and more particularly to a method of conveying workpieces and improvements in a conveyor for decorating apparatus of the type described, wherein the workpieces are in a horizontal position when being registered and from the present conveyor; and wherein the workpieces are in horizontal position when being registered and decorated.

(2) *Description of the prior art.*—In the past, workpieces have been placed on a loading conveyor in a vertical position and conveyed thereby to one end of the decorating apparatus. At this point, the workpieces are grasped by transfer apparatus and transferred from the loading conveyor to the carriers on the main conveyor of the decorating apparatus while simultaneously reorienting the workpieces from their vertical position on the loading conveyor to a horizontal position on the carrier. The workpieces are then conveyed to the opposite end of the decorating apparatus during which the workpieces are registered, if required, and decorated. At the opposite end of the conveyor, a second transfer apparatus grasps the decorated workpieces and transfers them to a discharge conveyor while simultaneously reorienting the workpieces from their horizontal position on the carriers back to a vertical position on the discharge conveyor. Examples of typical transfer apparatus employed to reorient the workpieces will be found in U.S. Patent Nos. 2,231,535, 2,261,255 and 3,237,555. Another example of such transfer apparatus will be found in our issued U.S. Patent No. 3,272,349.

Inspection of these and other patents will reveal that the transfer apparatus is indeed a complicated mechanism requiring synchronization with the movement of the main conveyor. In this connection, should the operation of the transfer apparatus change, for some reason or other, such that synchronism is lost, complete shutdown of the decorating apparatus is required to restore the apparatus to proper working order. Much operating time has been lost in this way. Furthermore, these transfer apparatus are complicated mechanisms which add considerably to the cost of the decorating apparatus as a whole. Certain of these prior art transfer apparatus extend from the opposite ends and parallel with the movement of the main conveyor. In these situations, the transfer apparatus adds considerably to the overall length of the decorating apparatus.

SUMMARY OF THE INVENTION

Accordingly, as an overall object, the present invention seeks to provide an improved conveyor for decorating apparatus of the type described which receives workpieces in a vertical position and reorients them to a horizontal position for registration and decoration and then discharges the workpieces in their original vertical position.

Another object of the present invention is to provide improved decorating apparatus wherein the need for complex transfer mechanisms is entirely eliminated.

A further object of the present invention is to provide a novel method of conveying workpieces.

The present invention is directed to those decorating machines having an endless conveyor including an upper reach and a lower reach; spaced sprockets supporting said endless conveyor; and means for driving the endless conveyor.

In accordance with the present invention, improvements are provided in the endless conveyor which comprise supporting the spaced sprockets for rotation about parallel axes which are inclined relative to the horizontal, and such that the upper reach and the lower reach of the endless conveyor are likewise inclined relative to the horizontal. A plurality of workpiece carriers is provided each of which is adapted to support a workpiece for rotation about the central axis of the workpiece. Means is provided for securing the workpiece carriers at spaced locations along the length of the endless conveyor and inclined relative to the parallel axes of the spaced sprockets. The overall arrangement is such that each workpiece carrier and the workpiece carried thereon is (a) disposed in a generally horizontal position when travelling along the upper reach and (b) disposed in a generally vertical position when travelling along the lower reach.

Further in accordance with the present invention, a loading station is situated at a location adjacent to the lower reach of the endless conveyor. The loading conveyor is provided for conveying workpieces in succession and in a generally vertical position to the loading station for deposition, in the vertical position on successive ones of the workpiece carriers. Additionally, a discharge station is located on the lower reach ahead of the loading station. Discharge conveyor means is provided for conveying decorated workpieces discharged from the main conveyor in a vertical position away from the decorating machine.

DESCRIPTION OF THE DRAWINGS

The above and other objects and advantages of the present invention will become apparent from the following detailed description by reference to the accompanying drawings, in which.

GENERAL DESCRIPTION

Although not limited thereto, the endless conveyor of the present invention is particularly adapted for use in decorating apparatus of the continuous motion type, such as, the decorating apparatus described and illustrated in our U.S. Patent No. 3,251,298. In addition, although not limited thereto, the endless conveyor of the present invention is adapted for use in conjunction with workpiece carrier assemblies such as those described and illustrated in our copending U.S. patent application Ser. No. 414,079, filed Nov. 27, 1964, and entitled Workpiece Carrier Assembly for Decorating Apparatus, now U.S. Patent No. 3,338,574. Such decorating apparatus and carrier assemblies are illustrated in the appended drawings and a brief description thereof will be made in conjunction with the detailed description of the present invention. For a more detailed description of the construction and operation of the decorating apparatus and the carrier assemblies, attention is directed to the aforesaid U.S. Patent No. 3,251,298 and to the copending U.S. patent application Ser. No. 414,079, now U.S. Patent No. 3,338,574.

Figure 1:
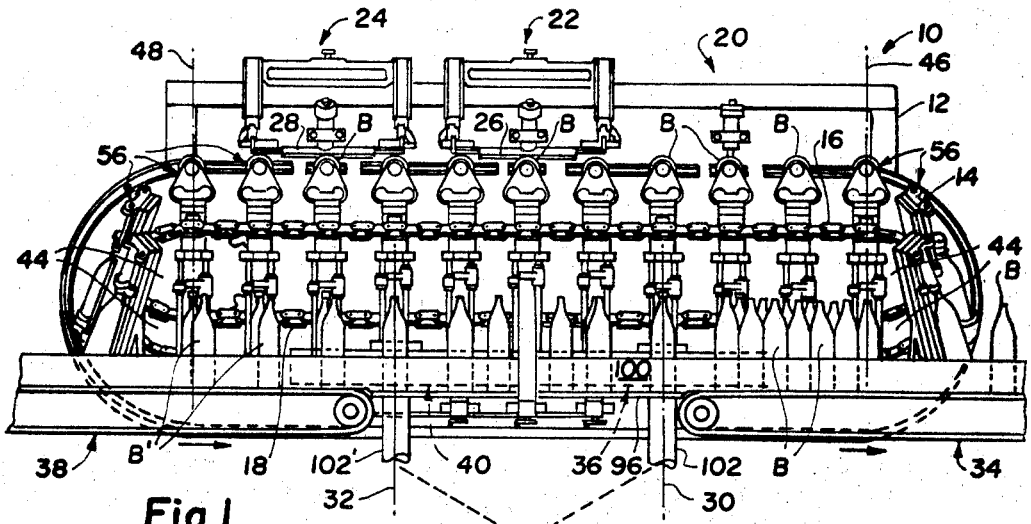
FIGURE 1 is a side view of a decorating apparatus provided with the endless conveyor of the present invention.
Figure 2:
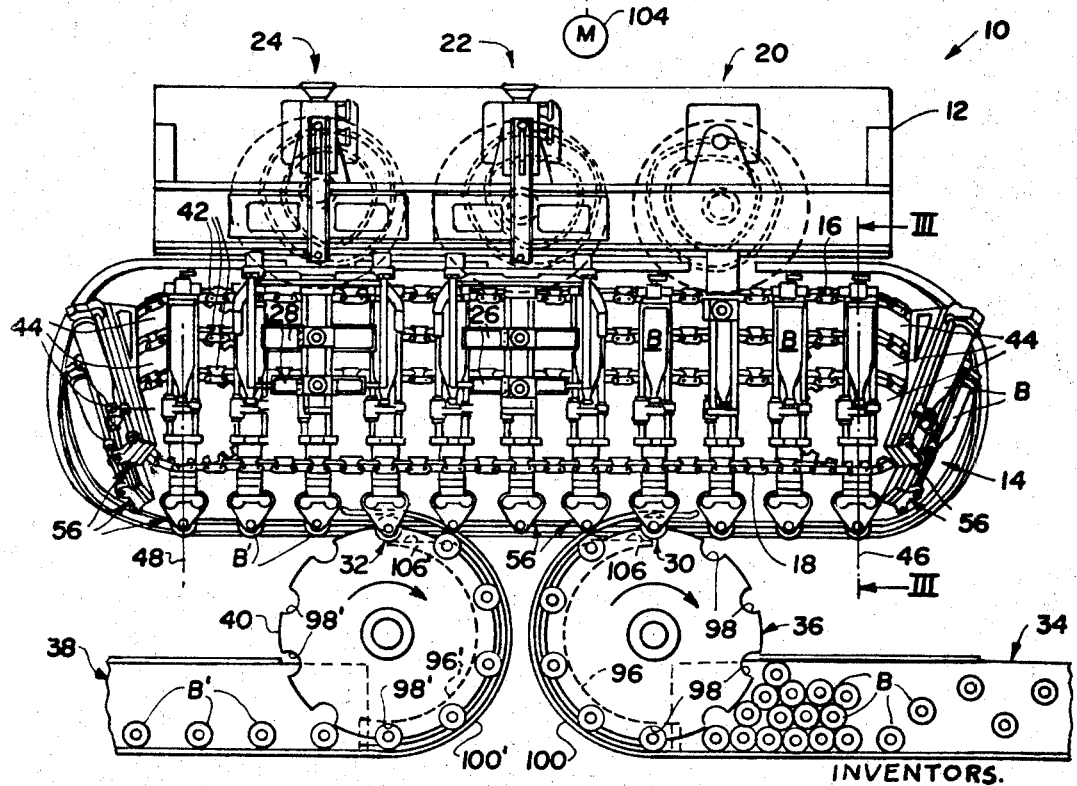
FIG. 2 is a plan view of the decorating apparatus of FIG. 1.

Referring now to FIGS. 1 and 2, there is shown decorating apparatus 10 including a frame 12 supporting a main conveyor 14 of the present invention. The main conveyor 14 includes an upper reach 16 and a lower reach 18. The apparatus 10 additionally includes a registration station 20, a first decorating station 22, and a second decorating station 24. The stations 20, 22 and 24 are positioned above and along the upper reach 16 of the main conveyor 14, as is conventional. For a description of the construction and operation of the mechanisms incorporated into the registration station 20, and the first and second decorating stations 22 and 24, attention is directed to the aforesaid U.S. Patent No. 3,251,298. For the purposes of the present invention, it will be sufficient to state that (1) at the registration station 20, workpieces such as bottles B are registered exactly with respect to decorating screens 26, 28 positioned at the first and second decorating stations 22, 24 respectively, and carrying a design to be transferred to the bottles B; (2) at the first decorating station 22, decorative imprints of one color are applied to the body and neck portions of the bottles B; and (3) at the second decorating station 24, second decorative imprints of the second color are applied to the body and neck portions of the bottles B. As is conventional, the aforesaid two decorative imprints comprise a two-color composite of the final decorative imprint.

The apparatus 10 additionally includes a loading station 30 at which bottles B are deposited on the main conveyor 14 and an unloading station 32 ahead of the loading station 30 at which decorated bottles B' are discharged from the main conveyor 14. The loading station 30 and the unloading station 32 are positioned along the lower reach 18 of the main conveyor.

Means, such as a loading conveyor 34, is provided for conveying workpieces in succession and in a generally vertical position to the apparatus 10. Means, such as a first star wheel assembly 36, is positioned at the end of the loading conveyor 34 for transferring the workpieces from the loading conveyor 34 to the main conveyor 14.

Means, such as a discharge conveyor 38, is provided for conveying the decorated workpieces B' from the apparatus 10. Means, such as a second star wheel assembly 40, is provided for transferring the decorated workpieces B' from the discharge station 32 to the discharge conveyor 38.

It will be noted by comparing FIGS. 1 and 2 that the workpieces are in a generally vertical position when travelling along the lower reach 18; and that the workpieces are in a generally horizontal position when travelling along the upper reach 16 of the main conveyor 14. Additionally, the workpieces B are in a vertical position while conveyed to and deposited on the lower reach 18 of the main conveyor 14; and the decorated workpieces B' are again in a vertical position while being discharged from and conveyed from the apparatus 10.

Thus, in accordance with the present invention and as will be more fully described, the present main conveyor 14 operates to reorient the workpieces from a generally vertical position to a generally horizontal position for registration and decoration and then back to a generally vertical position for discharge. The present main conveyor 14 thus has two functions, that is, its normal function of conveying the workpieces through the decorating apparatus and the new and additional function of re-orienting the workpieces from a vertical position to a horizontal position and then back to a vertical position. It will also be noted that the present main conveyor 14 eliminates the need for the above-described orienting and transfer mechanisms required in the prior art.

MAIN CONVEYOR 14

Figures 3, 3A:
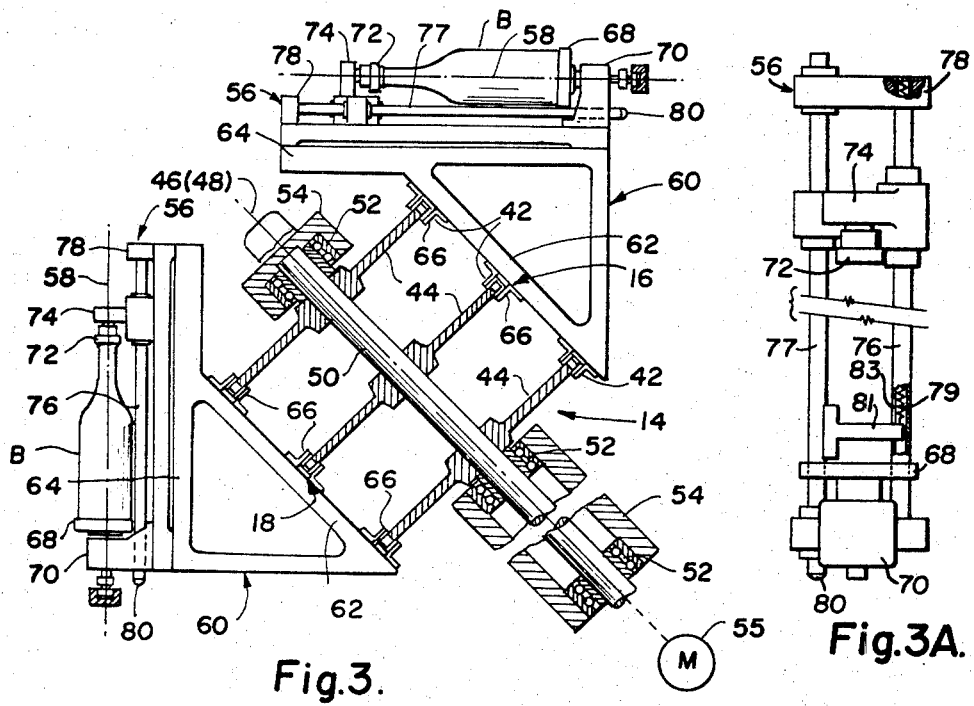
FIG. 3 is a cross-sectional view taken substantially along the line III—III of FIG. 2.
FIG. 3A is a plan view, partly in cross section, of a workpiece carrier.

Referring now to FIGS. 1, 2 and 3, the main conveyor 14 comprises three endless chains 42 supported on groups of sprockets 44, one group being positioned at each end of the frame 12. The groups of sprockets 44 are rotatable about spaced parallel axes illustrated in FIGS. 1 and 2 by the dash-dot lines 46, 48.

As can best be seen in FIG. 3, each group of the sprockets 44 is carried by a common shaft which, in turn, is rotatably supported on journals 52. The journals 52 are supported on frame elements 54, schematically illustrated in FIG. 3 and forming part of the main frame 12. Motor means, schematically illustrated at 55, serves to drive one of the common shafts 50 and hence the endless chains 42.

In accordance with the present invention, the common shaft 50 is inclined from the horizontal, for example, at an angle of 45°. Thus, the groups of sprockets 44 are, likewise, rotatable about the spaced parallel axes 46, 48 which are inclined from the horizontal.

The main conveyor 14 additionally includes a plurality of workpiece carriers 56 each adapted to support a workpiece, such as the bottle B for rotation about the central axis 58 of the workpiece. Means, in the form of a bracket 60, is provided for securing the workpiece carriers at the spaced locations along the length of the main conveyor 14 and such that the central axes 58 of the workpieces B are inclined relative to the spaced parallel axes 46, 48 of the spaced sprockets 44. Each of the brackets 60 comprises a base 62 and a platform 64. The base 62 is secured to the endless chains 42 by means of connecting links 66 which are secured to the base 62 and form a part of the endless chains 42. The workpiece carriers 56 are rigidly secured to the platforms 64.

As can best be seen in FIG. 3, the overall arrangement of the present main conveyor 14 is such that when the workpiece carriers 56 are moving along the upper reach 16, the workpieces B are disposed in a generally horizontal position for registration and decoration; and when the workpiece carriers 56 are travelling along the lower reach 18, the workpieces B are disposed in a generally vertical position.

WORKPIECE CARRIER 56

As stated above, the workpiece carrier 56 preferably comprises that carrier described and illustrated in our copending application Ser. No. 414,079, now U.S. Patent No. 3,338,574. For a complete description of the construction and operation of the carrier assembly reference is made to the aforesaid copending application Ser. No. 414,079, now U.S. Patent No. 3,338,574. For the purposes of the present invention, however, it is believed sufficient to state that as shown in FIGS. 3 and 3A, the workpiece carrier 56 comprises a base chuck 68 rotatably supported on a stationary standard 70, and a neck chuck 72 rotatably supported on a movable standard 74. The movable standard 74 is positionable along the length of a pair of support shafts 76, 77. The pair of support shafts 76, 77 are supported at one end on a support block 78 and at their opposite ends on the stationary standard 70. Although not specifically illustrated, the movable vertical standard 74 is releasably secured to the shaft 77, which shaft is supported for a reciprocal movement along its longitudinal axis and has an operating end 80 projecting from the stationary vertical standard 70. As best shown in FIG. 3A, the shaft 76 is hollow and contains a spring 79 whose end is connected to an arm 81 projecting from the shaft 77 through a slot 83 provided in the shaft 76. The movable shaft 77 is resiliently urged by the spring 79 in a direction which causes the workpiece to be clamped between the neck chuck 72 and the base chuck 68. Movement of the operating end 80 toward the stationary vertical standard 70, causes the neck chuck 72 to move away from the base chuck 68 thereby releasing the workpiece B. It should also be noted that the neck chuck 72 is positionable at various locations along the length of the pair of shafts 76, 77. The distance between the neck chuck 72 and the base chuck 68 may be varied with the result that the workpiece carrier 56 is capable of supporting workpieces of various lengths.

Figure 5:
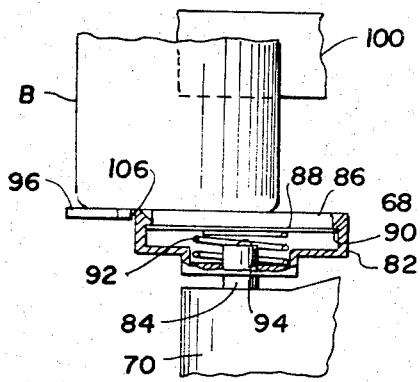
FIG. 5 is a fragmentary side view, partly in cross section, illustrating a base chuck and certain principles related to the discharge and deposition of a workpiece.
Figure 6:
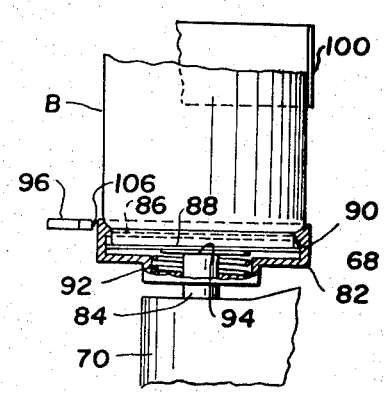
FIG. 6 is a fragmentary side view, partly in cross section, illustrating the base chuck of FIG. 5 with a workpiece clamped thereto.

Referring now to FIGS. 5 and 6, it will be seen that the base chuck 68 comprises a hub 82 secured to a shaft 84 which, in turn, is rotatably supported in the stationary standard 70. The base chuck 68 additionally includes a face plate 86 having an annular flange 88 which is engageable with an annular shoulder 90 formed in the hub 82, as shown in FIG. 5. Spring means 92 located within the hub 82 urges the face plate 86 in a direction away from the shaft 84.

Accordingly, the face plate 86 has two positions. The first position is illustrated in FIG. 5 wherein the annular flange 88 is engaged with the annular shoulder 90. In this position the outer face of the face plate 86 is flush with the outer face of the hub 82. The second position of the face plate 86 is illustrated in FIG. 6 wherein the face plate 86 has been depressed inwardly of the hub 82 and engages an end 94 of the shaft 84.

Thus, as can be seen in FIG. 3, workpiece B may be guided across a support plate 96 having an upper surface which is flush with the upper surface of the face plate 86. The workpiece B may be positioned directly above the base chuck 68 as shown in FIG. 6, and clamped between the base chuck 68 and the neck chuck 72 (not shown). Upon clamping, the workpiece B will cause the face plate 86 to be depressed inwardly of the hub 82. At this time, the workpiece B will be clamped between the base chuck 68 and the neck chuck 72 in the manner shown in FIG. 3.

LOADING OPERATION

Referring now in particular to FIG. 2, the loading conveyor 34 conveys workpieces B to the first star wheel assembly 36. The first star wheel assembly 36 includes a plurality of pockets 98, each of which is adapted to receive one workpiece B in nested relation therewith. Associated with the first star wheel assembly 36 is a guide plate 100 which guides the workpieces B held captive within the pockets 98, to the loading station 30. The guide plate 100 extends into the path of travel of the workpiece carriers 56 travelling along the lower reach 18. Thus, as can be seen in FIGS. 1 and 2, the star wheel assembly 36, the support plate 96 and the guide plate 100 cooperate to support and transfer the workpieces B in a vertical position from the loading conveyor 34 onto successive ones of the workpiece carriers 56. The star wheel assembly 36 may be supported on a drive shaft 102 and driven by a motor schematically illustrated at 104. Obviously, the star wheel 36 is driven in synchronism with the movement of the main conveyor 14 such that each of the pockets 98 will be coincident with successive ones of the workpiece carriers 56.

As can be seen in FIGS. 2, 5 and 6, the support plate 96 terminates in an edge 106 which is slightly spaced from the path of travel of the base chuck 68. Inasmuch as the star wheel 36 and the workpiece carriers 56 are moved in timed relation, each of the workpieces B will move off of the support plate 96 onto the face plate 86, while simultaneously being moved in an arcuate path as defined by the guide plate 100. The arrangement is such that successive ones of the workpiece carriers 56 and the pockets 98 of the first star wheel assembly 36 will simultaneously be coincident with the loading station 30. At this time, the workpiece B carried thereby will be clamped between the neck chuck and base chuck of the workpiece carrier 56.

DISCHARGE OPERATION

Referring again in particular to FIG. 2, the discharge operation is similar in many respects to the loading operation. Consequently, corresponding primed numerals will be employed to identify parts of the unloading apparatus which correspond to elements already described in the loading apparatus.

The second star wheel assembly 40 is provided with a plurality of pockets 98' each adapted to captively receive one of the decorated workpieces B'. The second star wheel assembly 40 has associated therewith a guide plate 100' which extends into the path of travel of the workpiece carriers 56. The second star wheel assembly 40 also includes a support plate 96' extending from the discharge conveyor 38 and terminates in an edge 106' spaced apart from the path of travel of the base chuck 68 of the workpiece carriers 56. As can be seen in FIG. 1, the second star wheel assembly 40 is supported on a drive shaft 102' and is driven, in synchronism with the first star wheel assembly 36, by the motor 104.

As will be more fully described, each of the decorated workpieces B' will be released from the workpiece carrier 56 carrying the same the instant it arrives at the unloading station 32. As should be evident from FIG. 2, each decorative workpiece B' will be received in one of the pockets 98" such that when released from the workpiece carrier, it will be guided by the guide plate 100" along the support plate 96" to the discharge conveyor 38.

CLAMPING AND RELEASING WORKPIECES

Figure 4:
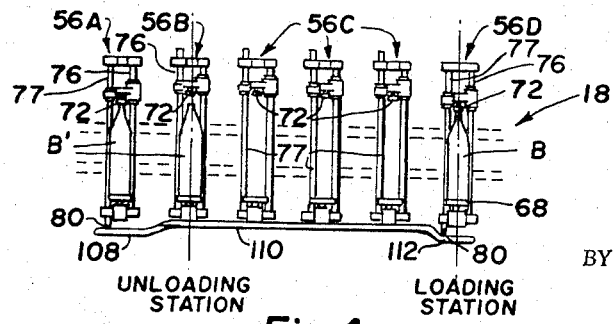
FIG. 4 is a fragmentary side view of the lower reach of the present endless conveyor illustrating relative positions of a loading station and an unloading station.

Reference is now directed to FIG. 4 wherein there is schematically illustrated a segment of the lower reach 18 which includes the unloading station 32 and the loading station 30. Illustrated in FIG. 4 is a first workpiece carrier 56A at a position prior to the unloading station 32; a second workpiece carrier 56B disposed at the unloading station 32; three intermediate workpiece carriers 56C positioned between the unloading and loading stations 32, 30; and a workpiece carrier assembly 56D disposed at the loading station 30. It is to be understood that the workpiece carriers 56 are conveyed continuously and in succession past the unloading and loading stations 32, 30 and that FIG. 4 has been included for the purpose of illustrating and describing the various positions of each workpiece carrier in relation to the unloading and loading stations 32, 30.

The workpiece carrier 56A is shown supporting and clamping a decorated workpiece B'. When the workpiece carrier 56A moves to the position of workpiece carrier 56B, the operating end 80 of the movable shaft 77 will engage a leading end 108 of a cam 110. As the workpiece carrier 56A progresses to the position illustrated by the workpiece carrier 56B, the movable shaft 76 along with the neck chuck 72 will be displaced upwardly thereby releasing the decorated workpiece B'. While at the unloading station 32 the decorated workpiece B' will be captured by the guide plate 100' and one of the pockets 98' (FIG. 2) and conveyed to the discharge conveyor 38 (FIG. 2). From the unloading station 32, the workpiece carrier 56B will progress to those positions illustrated by the workpiece carriers 56C, during which the neck chuck 72 and the movable shaft 77 will remain in a vertically displaced position. Now, as the workpiece carrier assemblies arrive at the loading station 30, as illustrated by the workpiece carrier 56D, an undecorated workpiece B will be conveyed by the first star wheel assembly 36 (FIG. 2) into coincidence with the base chuck 68 and neck chuck 72. At that time, the operating end 80 of the movable shaft 77 will be disengaged from a trailing end 112 of the cam 110 whereupon the movable shaft 77 and the neck chuck 72 will be urged toward and clamp the workpiece B between the neck chuck 72 and the base chuck 68. Thereafter, the undecorated bottle B will be conveyed along the remainder of the lower reach around the end of the endless conveyor 14 to the upper reach for registration, and decoration and return the same to the unloading station 32 for discharge.

SUMMARY

From the foregoing detailed description it will be readily apparent that the present invention provides an improved conveyor which, although not limited thereto, is especially adapted for use with decorating apparatus for receiving workpieces in a vertical position and reorienting them to a horizontal position for registration and decoration and then returning the workpieces to a vertical position for discharge. It should also be apparent that the present improved conveyor eliminates the necessity of the complex costly mechanisms heretofore employed for transferring and reorienting the workpieces. It should likewise be apparent that the present invention provides a decorating apparatus which can be operated at speeds heretofore unattainable by prior art decorating machines.

We claim as our invention:

1. In a decorating machine having an endless conveyor including an upper reach and a lower reach, spaced sprockets supporting said endless conveyor, and means for driving said endless conveyor, the improvement comprising:
    frame means supporting said spaced sprockets for rotation about parallel axes which are inclined relative to the horizontal;
    a plurality of workpiece carriers, each adapted to support a workpiece for rotation about the central axis of said workpiece; and
    means for securing said workpiece carriers at spaced locations along the length of said endless conveyor and inclined relative to said parallel axes of said spaced sprockets whereby each workpiece carrier and the workpiece carried thereon is disposed in a generally horizontal position when traveling along said upper reach and disposed in a generally vertical position when travelling along said lower reach.

2. The improvement defined in claim 1 including:
    a loading station at a location adjacent to said lower reach; and
    means for conveying workpieces in succession and in a generally vertical position to said loading station for deposition on successive ones of said workpiece carriers.

3. The improvement defined in claim 2 including:
    a discharge station at a location adjacent to said lower reach which is ahead of said loading station; and
    means for conveying workpieces discharged from said discharge station away from said decorating machine.

4. The improvement defined in claim 1 wherein said means for securing said workpiece carriers to said endless conveyor comprises:
    a bracket having a base secured to said endless conveyor and a platform which is inclined relative to said base and said parallel axes of said spaced sprockets; and
    said workpiece carriers being secured to said platform.

5. In the method of decorating workpieces on a decorating apparatus having an endless conveyor, a loading station and a discharge station, wherein the workpieces are conveyed past work stations including a registration station and at least one decorating station, the steps comprising:
    conveying said workpieces in a vertical position and in succession to said loading station;
    depositing said workpieces on said endless conveyor in said vertical position;
    transporting said workpieces by said endless conveyor to said work stations while simultaneously reorienting said workpieces by said endless conveyor from said vertical position to a horizontal position;
    performing work operations on said workpieces at said work stations while in said horizontal position and while being conveyed past said work stations;
    transporting said workpieces by said endless conveyor from said work stations to said discharge station while simultaneously reorienting said work pieces by said endless conveyor from said horizontal position to said vertical position; and
    discharging said workpieces from said endless conveyor in said vertical position for conveyance away from said decorating apparatus.

References Cited
UNITED STATES PATENTS

| | | | |
|---|---|---|---|
| 2,667,958 | 2/1954 | Malhiot | 198—179 X |
| 2,879,883 | 3/1959 | Wolford | 198—33 |
| 3,068,990 | 12/1962 | Drennan | 198—33 |
| 3,208,579 | 9/1965 | Perrier et al. | 198—33 |

EVON C. BLUNK, *Primary Examiner.*

M. L. AJEMAN, *Assistant Examiner.*